(12) United States Patent
Mahdi (10) Patent No.: US 9,071,921 B2
(45) Date of Patent: Jun. 30, 2015

(54) SYSTEM AND METHOD FOR EVENT DRIVEN OPERATIONS IN A COMMUNICATIONS SYSTEM (75) Inventor: Kaniz Mahdi, Carrollton, TX (US)

(73) Assignee: Futurewei Technologies, Inc., Plano, TX (US)

( * ) Notice: Subject to any disclaimer, the term of this patent is extended or adjusted under 35 U.S.C. 154(b) by 650 days.

(21) Appl. No.: 12/645,672

(22) Filed: Dec. 23, 2009

(65) Prior Publication Data

US 2011/0151869 A1 Jun. 23, 2011

(51) Int. Cl.
*H04W 4/02* (2009.01)
*H04W 4/00* (2009.01)
*H04L 29/06* (2006.01)

(52) U.S. Cl.
CPC ............ *H04W 4/00* (2013.01); *H04L 65/1016* (2013.01); *H04L 65/1096* (2013.01)

(58) Field of Classification Search
USPC .......... 455/432.1, 432.3, 435.1, 435.2, 456.3, 455/414.1
See application file for complete search history.

(56) References Cited

U.S. PATENT DOCUMENTS

| 2006/0046759 | A1 | 3/2006 | Yoon et al. | |
| 2006/0052113 | A1* | 3/2006 | Ophir et al. | 455/456.1 |
| 2006/0064346 | A1 | 3/2006 | Steenstra et al. | |
| 2008/0064398 | A1 | 3/2008 | Zhu | |
| 2009/0258644 | A1* | 10/2009 | Osborn | 455/432.1 |
| 2012/0059913 | A1* | 3/2012 | Imbimbo et al. | 709/219 |
| 2013/0078997 | A1* | 3/2013 | Hicks et al. | 455/426.1 |

FOREIGN PATENT DOCUMENTS

| CN | 1744732 A | 3/2006 |
| CN | 1808996 A | 7/2006 |
| CN | 101043507 A | 9/2007 |
| CN | 101049034 A | 10/2007 |
| EP | 0 174 237 A1 | 3/1986 |
| EP | 1742437 A1 | 1/2007 |
| WO | WO 2007/139877 A1 | 12/2007 |
| WO | WO 2007/147357 A1 | 12/2007 |
| WO | WO 2008/036265 A2 | 3/2008 |

OTHER PUBLICATIONS

International Search Report and the Written Opinion of the International Searching Authority, Mar. 31, 2011, Internation Application No. PCT/CN2010/079970, Applicant: Huawei Technologies Co., LTD., 12 pages.
"First Chinese Office Action," Chinese Application No. 201080014430.9, mailing date: Jul. 31, 2013, 12 pages. (w/ Partial Translation).
"Written Opinion and International Search Report," International Application No. PCT/CN2010/079970, Applicant: Huawei Technologies Co., Ltd., et al, mailing date: Mar. 31, 2011, 9 pages.
Second Chinese Office Action received in Chinese Application No. 201080014430.9, mailed Apr. 2, 2014, 9 pages.

* cited by examiner

*Primary Examiner* — Daniel Lai
(74) *Attorney, Agent, or Firm* — Slater & Matsil, L.L.P.

(57) ABSTRACT

A system and method for event driven operations in a communications system. A method for communications subsystem operation includes detecting an occurrence of an event initiated by a user, accessing a database to retrieve information related to the user and the event, establishing a connection with an application, and performing an operation with the application through the connection. The application is based on the event and the information, and the operation is based on the event.

23 Claims, 4 Drawing Sheets

SYSTEM AND METHOD FOR EVENT DRIVEN OPERATIONS IN A COMMUNICATIONS SYSTEM

TECHNICAL FIELD

The present invention relates generally to wireless communications, and more particularly to a system and method for event driven operations in a communications system.

BACKGROUND

Generally, a two-sided business model involves two distinct user groups with a provider providing an infrastructure used by both user groups. A first of the two user groups, also referred to as upstream customers typically provide services and/or products that may be used by a second of the two user groups, also referred to as downstream customers. Both the upstream customers and the downstream customers may make use of the infrastructure provided by the provider to communicate, sell/buy services and/or products, make payments, and so forth. Examples of upstream customers may include developers, retailers, governments, content owners, and so forth, while downstream customers are normally end users.

Figure 1:
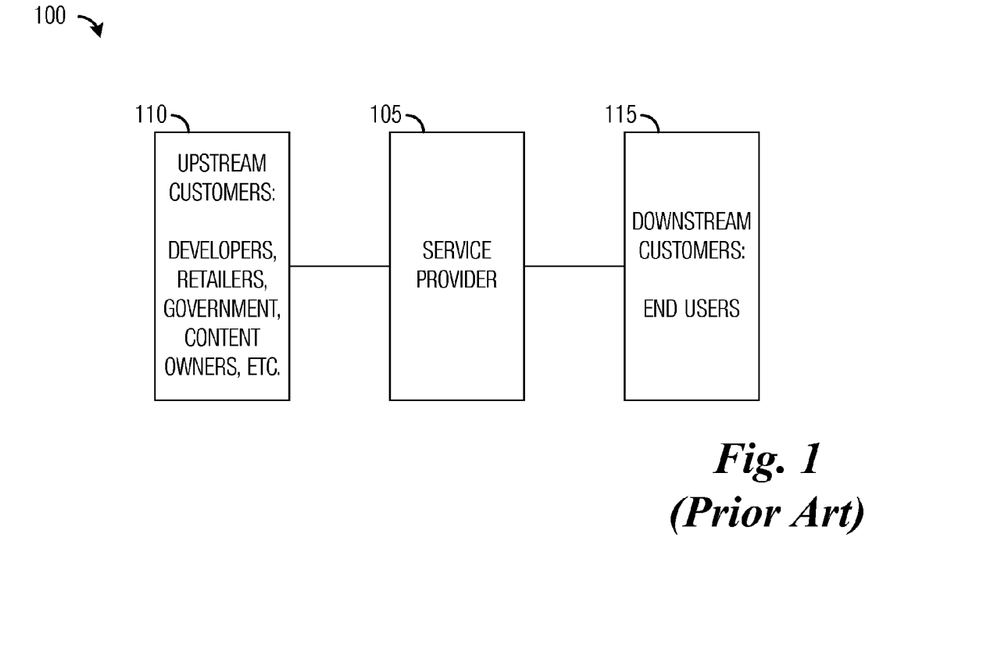
FIG. 1 is a diagram of a prior art communications network arranged to support a two-sided business model involving a service provider.

FIG. 1 illustrates a prior art communications network 100 arranged to support a two-sided business model involving a service provider. Communications network 100 includes a service provider 105 that may provide data and/or voice services to upstream customers 110 as well as downstream customers 115. Service provider 105 may be a telecommunications service provider, such as a regional bell operating company (RBOC), a cable-based data provider, a digital subscriber line data provider, a satellite data provider, a power line data provider, a wireless telecommunications data provider (such as a cellular telephone company, a wireless network provider, and so forth), and so on, that bills its customers (upstream customers 110 and downstream customers 115) for telecommunications service. In addition to charging for data/voice connectivity related services, service provider 105 may also be able to charge upstream customers 110 a commission if service provider 105 participated in introducing downstream customers 115 to upstream customers 110.

SUMMARY OF THE INVENTION

These and other problems are generally solved or circumvented, and technical advantages are generally achieved, by embodiments of a system and method for event driven operations in a communications system.

In accordance with an embodiment, a method for communications subsystem operation is provided. The method includes detecting an occurrence of an event initiated by a user, accessing a database to retrieve information related to the user and the event, establishing a connection with an application, and performing an operation with the application through the connection. The application is based on the event and the information, and the operation is based on the event.

In accordance with another embodiment, a method for upstream customer operation is provided. The method includes establishing a connection with a communications subsystem, receiving information over the connection, verifying the initiator, and performing an operation with the communications subsystem through the connection. The information is based on an event detected by the communications subsystem and an initiator of the event, and the operation is based on the event.

In accordance with another embodiment, a communications system is provided. The communications system includes a communications subsystem coupled to at least one downstream customer and to at least one upstream customer. The communications subsystem is coupled to the downstream customer by a service provider. The communications subsystem detects an event initiated by the downstream customer, retrieves information related to the downstream customer and the event, establishes a connection with the application based on the event and the information, and performs an operation with the application.

An advantage of an embodiment is that an Internet Protocol (IP) Multimedia Subsystem (IMS) may allow for a relatively seamless transition of a downstream customer between multiple service providers or access technologies without undue repetition of hardware and software, which may increase infrastructure costs.

A further advantage of an embodiment is that since a downstream customer may continue to access upstream customers through a variety of different service providers or access technologies, the user experience of the downstream customers may be high, while the upstream customers may maximize a number of downstream customers that may have access to their products and services.

Another advantage of an embodiment is that the IMS may be able to detect the occurrence of an event and trigger a specified action by an upstream customer based on a specification by a downstream customer. The detection of the event and the specified action may be triggered automatically once configured.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which.

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely a communications system configured as a two-sided business model with a number of service providers or access technologies.

When a communications network arranged as a two-sided business model as shown in FIG. 1 adds additional service providers and/or access technologies to allow for a greater number of downstream customers to access the products and services provided by the upstream customers, a considerable amount of additional infrastructure may be needed to enable the upstream customers to support access by downstream customers through the different service providers and/or access technologies. For example, an upstream customer may need an interface for each of the different service providers and/or access technologies. The interface may include additional communications network hardware and software, as well as customer databases for each different service providers and/or access technologies, since a single downstream customer may appear to be a different customer when it is accessing through a different service provider and/or access technology.

The additional infrastructure may dramatically increase the operating cost for the upstream customers, potentially making the two-sided business model less appealing. What is needed is a way to increase the number of downstream customers for upstream customers without significantly increasing the operating cost for either the upstream customers or the service providers.

Figure 2:
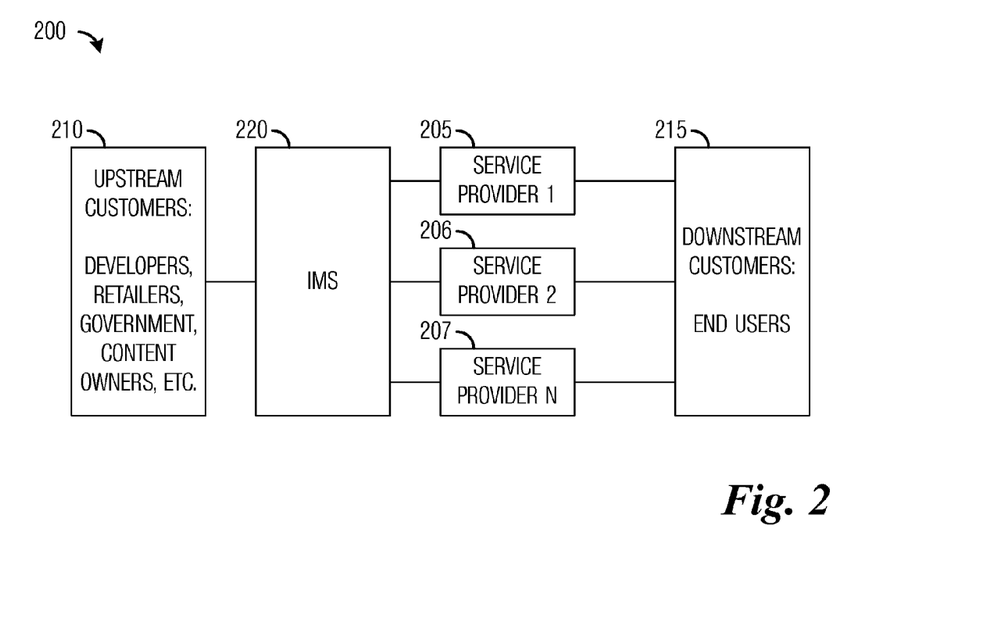
FIG. 2 is a diagram of a communications network arranged to support a two-sided business model involving multiple service providers.

FIG. 2 illustrates a communications network 200 arranged to support a two-sided business model involving multiple service providers. Communications network 200 includes a plurality of service providers (shown as service provider 1 205, service provider 2 206, and service provider N 207) that may provide data and/or voice services to upstream customers 210 as well as downstream customers 215. Communications network 200 also includes an IP Multimedia Subsystem (IMS) 220.

Although FIG. 2 illustrates communications network 200, it illustrates multiple service providers, embodiments may also be operable with multiple access technologies as well as a combination of multiple service providers and multiple access technologies. Therefore, the discussion of multiple service providers should not be construed as being limiting to either the scope or the spirit of the embodiments.

IMS 220 may be positioned between the plurality of service providers and upstream customers 210. IMS 220 may extend the reach of upstream customers 210 (increase a number of downstream customers 215 that may be able to access upstream customers 210) by allowing downstream customers 215 of the plurality of different service providers to access upstream customers 210 without significantly increasing operating costs for upstream customers 210 or the plurality of service providers. For example, IMS 220 may reduce hardware and software requirements typically associated with associating with interfacing with a large number of service providers, as well as reduce database requirements.

Some downstream customers 215 may have subscription to a single service provider. While other downstream customers 215 may have subscriptions to more than one service provider and other downstream customers 215 may have subscriptions with all service providers.

With IMS 220, upstream customers 210 may need to only interface with IMS 220 rather than each of the plurality of service providers separately. For example, as a downstream customer roams about and changes service providers, IMS 220 may perform identity and location conversions so that the downstream customer appears to upstream customers 210 as the same downstream customer regardless of the service provider used by the downstream customer to access upstream customers 210. The conversions performed by IMS 220 may simplify user database requirements of upstream customers 210 since only a single set of customer information for the downstream customer needs to be maintained by upstream customers 210 rather than a separate set of customer information for the downstream customer for each of the plurality of service providers.

Furthermore, IMS 220 may use metadata to enrich downstream user 215 experience, allow for user authentication and authorization without requiring an authentication/authorization server/database for each of the plurality of service providers, and provide policy and resource control.

Additionally, IMS 220 may detect the occurrence of an event, such as a downstream customer changing service providers (which may indicate that the downstream customer has changed location (home, work, vacation, business trip, and so forth)), a specified time of the day or week, the downstream customer performing a specified operation, or so on. The occurrence of the event may trigger IMS 220 to inform upstream customers 210, which take action based on preconfigured information for the downstream customer.

For example, if the event is a change in service providers that may indicate that the downstream customer is no longer at home (e.g., the downstream customer is on vacation or a business trip), then IMS 220 may inform upstream customers 210, one of which may be a mail delivery service or a newspaper delivery service, which may stop delivery of mail or newspapers to the downstream customer while the downstream customer continues to be using a different service provider or does not resume use of a designated home service provider. Operations taken by IMS 220 and upstream customers 210 may be configured by the downstream customer either a priori or in response to prompts provided by IMS 220 and/or upstream customers 210 in response to the detection of the event. Alternatively, location based events using location information, such as GPS, telemetry, or other positional information, may be used to target advertisement, programming, information, etc. (collectively referred to as content) to a communications device (for example, telephone, cellular telephone, PDA, computer, television, and so forth) being used by the downstream customer.

In addition to location based events, such as change of service providers and positional information, events may be time based (for example, depending on time of day, day of week, month, season, holiday, and so forth), specific operations, specific actions, and so on. For example, with time based events, targeted content may be pushed onto a communications device being used by the downstream user. For example, around dinner time, content advertising restaurants near the downstream customer may be pushed onto the communications device, while in the few weeks before the downstream user's birth day, content advertising retailers may be pushed onto the communications device. For events that are specific operations or specific actions, such as telephone calls to a travel agency or a restaurant, browsing websites containing specific information, websearching for specific information, and so on, targeted content may be pushed onto a communications device begin used by the downstream user.

Figure 3A:
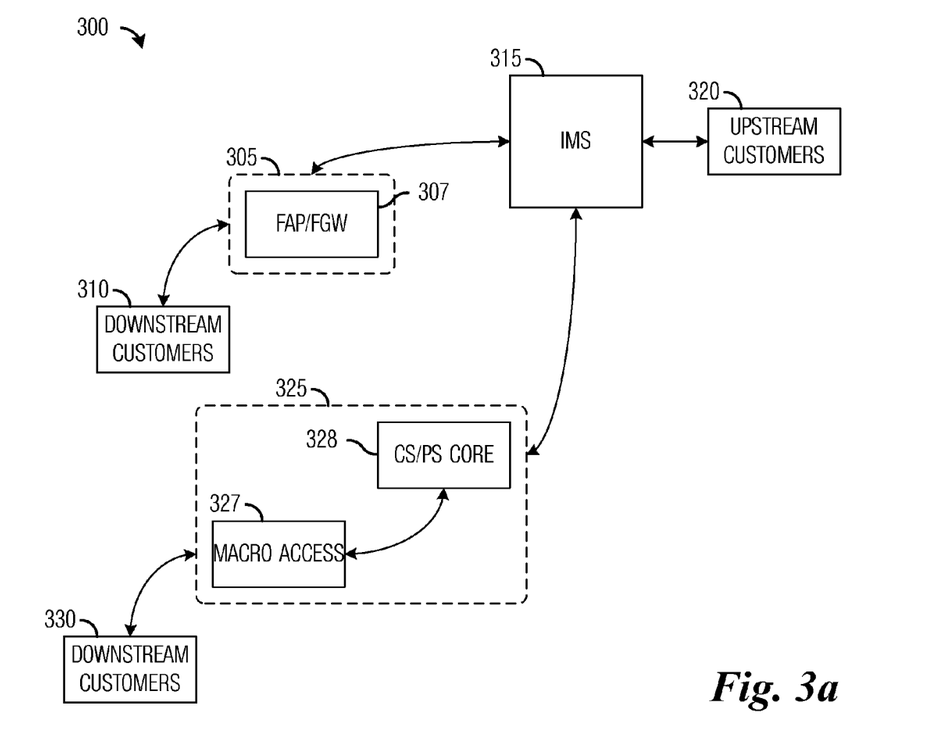
FIG. 3a is a diagram of a communications system arranged to support a two-sided business model involving two service providers.

FIG. 3a illustrates a communications system 300 arranged to support a two-sided business model involving two service providers. Communications system 300 includes a first service provider 305, which utilize a femtocell based wireless access technology (shown as a femtocell access point (FAP)/femtocell gateway (FGW) 307. First service provider 305 may have a number of downstream customers 310 that it may connect to IMS 315, which may provide connectivity to upstream customers 320. Communications system 300 includes a second service provider 325, which utilizes a macrocell wireless access technology (shown as macro access system 327 and circuit switched (CS)/packet switched (PS) core 328). Second service provider 325 may have a number of downstream customers 330 of its own that it may connect to IMS 315, which may provide connectivity to upstream customers 320.

With communications system 300 supporting both first service provider 305 and second service provider 325 through the use of IMS 315, upstream customers 320 may be accessible by downstream customers of both service providers, thereby potentially increasing a customer base of upstream customers 320.

A downstream customer may have a service agreement with both first service provider 305 and second service provider 325, therefore, depending on communications device used by the downstream customer, location of the downstream customer, and so forth, the service provider being used by the downstream customer to access services may change. For example, while the downstream customer is at home, the downstream customer may access services using the first service provider 305, while the downstream customer may access services using the second service provider 325 while at work or away from home.

Between first service provider 305 and IMS 315 may be a standard Third Generation Partnership Project (3GPP) IMS-based femto interface, while between second service provider 325 and IMS 315 may be a standard 3GPP PS and CS macro access interface. For CS access, an IMS centralized service (ICS) enabled communications device (UE) or a mobile switching center (MSC) server enhanced for ICS may be required. IMS 315 may include an IMS session initiation protocol (SIP) application server (AS) with an interface to a presence server and/or other IMS enablers may be needed to enable interfacing between the different service providers in the plurality of service providers.

Interaction between IMS 315 and upstream customers 320 may be event driven, for example, subscribe/notify, or message driven, for example, SIP or diameter. The interactions may occur over a SIP connection or through a web services interface. With a web services interface, a web services/SIP gateway may be required in a path between IMS 315 and upstream customers 320. Each of the upstream customers 320 may include a SIP AS or a web application.

As an example of a two-sided business model, consider a mail or newspaper delivery service with delivery suspend and resume capability. The mail delivery service (an upstream customer of one or more service providers) delivers mail to an end user (a downstream customer of one or more service providers). The end user may set in a customer profile through a web page or a widget on a communications device that when the end user is away from home (e.g., out of country, outside of a particular geographical region, or so on), the mail delivery service should suspend delivery of the end user's mail.

The end user takes a business trip and while on the road, the end user performs an IMS registration from another country or geographical region, for example, with second service provider 325. If the end user is using a CS service provider, IMS registration may be triggered by an ICS MSC with a location pull by an AS from a home location register (HLR) or from a presence server. IMS 315 may then detect that the end user is out of the country (or in a different geographical region) from the location information in the IMS registration or the location pull. IMS 315 may inform the mail delivery service of the end user's location or optionally inquire the end user if the end user wishes the mail deliver to be suspended (the end user may specify a default option in the user profile). IMS 315 may send the mail suspend request or the end user's response to the inquiry to the mail delivery service, which may respond accordingly, e.g., suspend mail delivery.

When the end user returns from the trip, the end user performs another IMS registration from a home service provider, for example, via a FAP or a FAP notification from first service provider 305, indicating that the end user is now home. IMS 315 may then detect that the end user is home, either through the FAP or the FAP notification or a presence server, and may send a mail resume request or notification to the mail delivery service, which may respond accordingly, e.g., resume mail delivery.

Figure 3B:
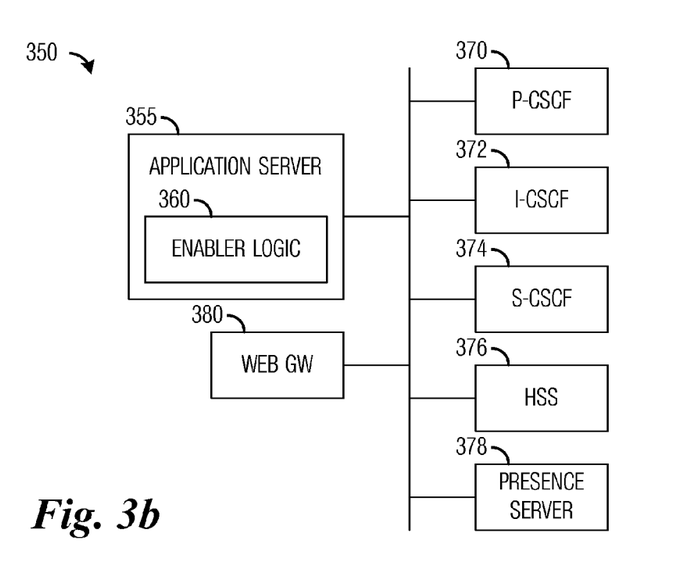
FIG. 3b is a diagram of an IMS with support for a two-sided business model involving multiple service providers.

FIG. 3b illustrates a diagram of an IMS 350 with support for a two-sided business model involving multiple service providers. IMS 350 includes a variety of components that may be coupled via a backhaul, wirelessly, or a combination of both. IMS 350 includes an application server 355 that may be used to host as well as execute services. Application server 355 may include enabler logic 360 that may be used to enable support of the two-sided business model with multiple service providers. As an example, application server 355 and enabler logic 360 may implement services including event detection, downstream customer prompting and interaction, upstream customer interaction, and so forth.

IMS 350 may also include a proxy call session control function (P-CSCF) 370 that may serve as an initial point of contact for a downstream customer, an interrogating CSCF (I-CSCF) 372 that may be used to regulate a flow of information between the downstream customer and the upstream customer, a serving CSCF (S-CSCF) 374 that may be used to perform session control services for the downstream customer, maintaining session state, and so forth.

IMS 350 may also include a home subscriber server (HSS) 376 may be used as a user database and provide subscription related information (for example, HSS 376 may provide user information based on the detected event, and a presence server 378 that may be used to manage presence information, which may comprise state information related to a downstream customer, an upstream customer, or so forth. Presence server 378 may also be used to handle subscriptions to presence information. IMS 350 may also include a web gateway (WEB GW) 380 that may be used to provide an interworking between session initiation protocol (SIP) and web services.

Figure 4A:
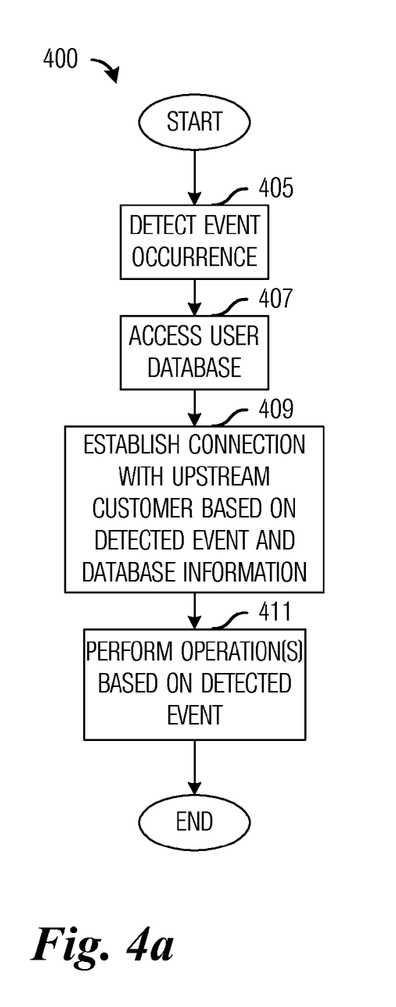
FIG. 4a is a flow diagram of IMS operations in providing event based functionality to interactions between downstream and upstream customers.

FIG. 4a illustrates a flow diagram of IMS operations 400 in providing event based functionality to interactions between downstream and upstream customers. IMS operations 400 may be indicative of operations in an IMS, such as IMS 315 of communications system 300, serving both downstream and upstream customers. IMS operations 400 may occur while the IMS is in a normal operating mode and may continue while communications system 300 is in operation.

IMS operations 400 may begin with the IMS detecting the occurrence of an event (block 405). As discussed previously, the event may be a registration message, a transmission, a specified time/day/date, a change in location, a connection, a search, or so forth, made by a downstream customer. For example, a registration message may be a message sent to the IMS by a service provider as the downstream customer attempts to register with the service provider, a change in location may be location/position information related to the downstream customer falling out or in a specified region or area, a connection may be a data/voice/multimedia connection made or received by the downstream user, and so forth.

Typically, the event or a message or transmission resulting from the event passes through the IMS to either an upstream customer or to a server of some sort, so detection of the occurrence of the event may be readily achieved by the IMS by scanning messages/transmissions for an identifier of the downstream customer, for example. After the IMS detects the occurrence of the event, the IMS may access a user database (block 407). The IMS may access the user database to perform several operations, including downstream customer authentication/authorization, as well as retrieving user information related to the downstream customer based on the type of event that has occurred. For example, if the event is a registration message indicating that the downstream user is attempting to register with a service provider, the IMS may retrieve user information for the downstream customer that may be dependent on the downstream user's location, such as information related to the mail delivery service discussed in the example earlier.

Based on the user information and the event, the IMS may then establish a connection with one or more upstream customers (i.e., third party application(s)) (block 409). The connection established with the one or more upstream customers may be uniquely associated with the downstream customer in situations wherein customer specific information may be exchanged. In an alternative embodiment, a generic connection may be established when no customer specific information may be exchanged. In yet another alternate embodiment, an existing connection between the IMS and the one or more upstream customers may be used. If an existing connection is to be shared, then encryption or some other technique may be used to help ensure that private information remains private.

With the connection established, the IMS and the one or more upstream customers and the downstream customers may perform operations, exchange transmissions, and so forth, based on the detected event (block 411). After the operations are complete, the transmissions made, and so on, IMS operations 400 may then terminate. If a connection was expressly established in response to the detected event, e.g., in block 409, then the connection may be deleted and resources freed.

Figure 4B:
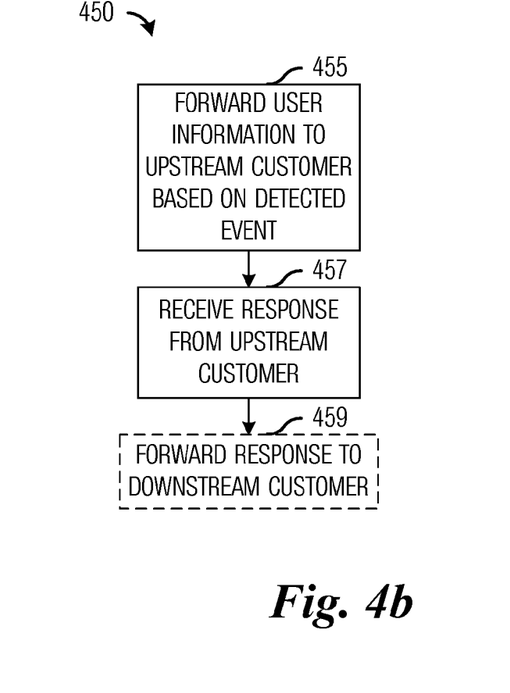
FIGS. 4b and 4c illustrate flow diagrams of IMS operations in performing operations based on a detected event.

FIG. 4b illustrates a flow diagram of IMS operations 450 in performing operations based on a detected event. IMS operations 450 may be indicative of operations occurring in an IMS, such as IMS 315 of communications system 300, serving both downstream and upstream customers. IMS operations 450 may be an implementation of block 411 (FIG. 4a), performing operation(s) based on detected event.

IMS operations 450 may begin with the IMS forwarding user information retrieved from a user database to the one or more upstream customers (i.e., third party applications) (block 455). The one or more upstream customers receiving the user information may be based on both the user information retrieved from the user database and the detected event. For example, if the event is a location change and the downstream customer uses the mail delivery service discussed in the example discussed earlier, then the IMS may forward the downstream customer's identity to the mail delivery service so that the downstream customer's mail may be held while the downstream customer is away from home. In another example, if the event is a telephone call made by the downstream customer to a travel agency or a web search of popular vacation destinations, then the IMS may forward information related to the downstream customer to an upstream customer specializing in vacations. However, depending on the downstream customer's preferences, which may be configured by the downstream user, the IMS may be limited on the amount and type of information that it may send to upstream customers.

After forwarding the user information of the downstream customer, the IMS may receive a response from the one or more upstream customers (block 457). The response from the one or more upstream customers may be dependent on the event type as well as the user information provided by the IMS. For example, returning to the mail delivery service example discussed previously, the mail delivery service may simply respond with an acknowledgement that the downstream user's mail delivery has been suspended. However, if the downstream user's user information specifies that the downstream user must be prompted regarding mail delivery suspension, then the response may be a message to be transmitted to the downstream user requesting confirmation regarding the suspension of the mail delivery. In a further example, if the event is a telephone call made by the downstream customer to a travel agency or a web search of popular vacation destinations, then the response may include an advertisement of the services offered by the upstream customer.

If the response from the upstream customer is to be forwarded to the downstream customer, such as a prompt, an advertisement, a question, or so forth, the IMS may forward the response to the downstream customer (block 459). Although not shown, additional messages may be exchanged between the downstream customer and the upstream customer. Therefore, the omission of a message exchange should not be construed as being limiting to either the scope or the spirit of the embodiments. IMS operations 450 may then terminate.

Figure 4C:
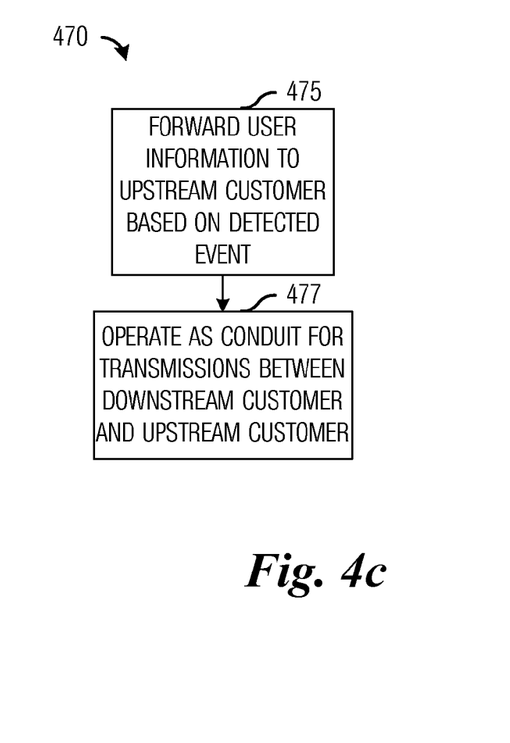

FIG. 4c illustrates a flow diagram of IMS operations 470 in performing operations based on a detected event. IMS operations 470 may be indicative of operations occurring in an IMS, such as IMS 315 of communications system 300, serving both downstream and upstream customers. IMS operations 470 may be an implementation of block 411 (FIG. 4a), performing operation(s) based on detected event.

IMS operations 450 may begin with the IMS forwarding user information retrieved from a user database to the one or more upstream customers (i.e., third party applications) (block 475). The one or more upstream customers receiving the user information may be based on both the user information retrieved from the user database and the detected event. After forwarding the user information to the upstream customer, the IMS may serve as a conduit for messages exchanged between the downstream customer and the upstream customer (block 477). After the message is complete, IMS operations 470 may then terminate.

Figure 5:
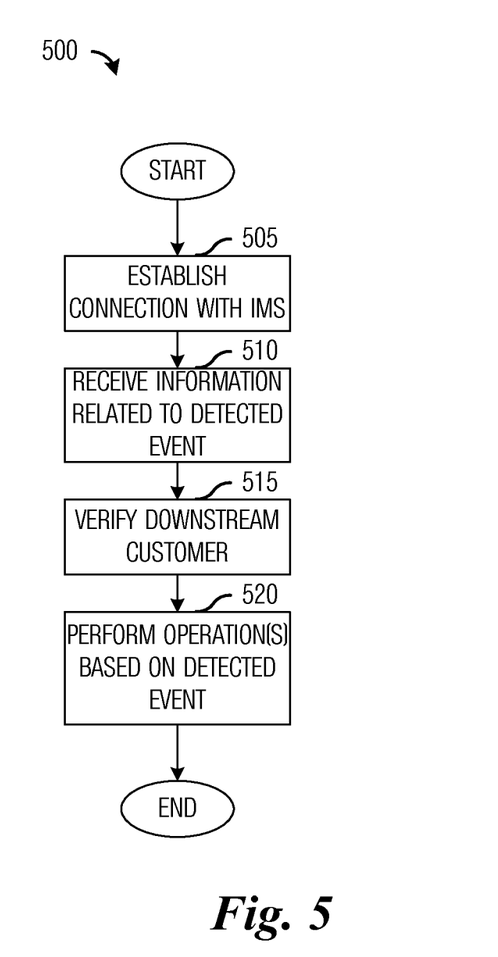
FIG. 5 is a flow diagram of upstream customer operations in interacting with a downstream customer through an IMS.

FIG. 5 illustrates a flow diagram of upstream customer operations 500 in interacting with a downstream customer through an IMS. Upstream customer operations 500 may be indicative of operations in an upstream customer as it interacts with a downstream customer through an IMS, such as IMS 315 of communications system 300. Upstream customer operations 500 may occur while the upstream customer is in a normal operating mode and may continue while communications system 300 is in operation.

Upstream customer operations 500 may begin with the upstream customer receiving a transmission from the IMS, the transmission to establish a connection with the IMS (block 505). The transmission may include user information regarding the downstream customer that initiated the event that was detected by the IMS. The connection may be dedicated for use by the upstream customer and the downstream customer. In an alternate embodiment, the connection may be used by other downstream customers that wish to communicate with the upstream customer. In yet another alternative embodiment, if a connection already exists between the IMS and the upstream customer, rather than creating another connection, the existing connection may be used. If an existing connection is to be shared, then encryption or some other technique may be used to help ensure that private information remains private.

The upstream customer may then receive information related to the detected event (block 510). For example, returning to the mail delivery service example discussed previously, the upstream customer may receive information regarding the position of the downstream customer, e.g., is the downstream customer at home or away from home. If the detected event is a call to a travel agency, the upstream customer may receive information about the travel history of the downstream customer, a wish list of vacation destinations, and so forth.

The upstream customer may verify the downstream customer (block 515). Depending on the detected event, the upstream customer may verify the identity and/or service level of the downstream customer. For some detected events, such as advertising, verification may not be needed. For example, the upstream customer may verify the identity of the downstream customer, along with the service (subscription) level that the downstream customer has contracted with the upstream customer.

After the downstream customer has been verified (if necessary), the upstream customer may perform operations with the downstream customer based on the detected event and the user information of the downstream customer (block 520). For example, the upstream customer may simply respond to the detected event if the detected event does not require interaction between the upstream customer and the downstream customer (for example, the mail delivery service example and so on), the upstream customer may transmit targeted content to a communications device being used by the downstream customer (for example, targeted advertisements, and so forth), or the upstream customer and the downstream customer may exchange messages. Once the operations are complete, upstream customer operations 500 may then terminate.

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for communications subsystem operation, the method comprising:
    detecting, by an Internet protocol (IP) multimedia subsystem (IMS), an occurrence of an event initiated by a user and communicated to the IMS by a service provider, wherein the event comprises a switch between service providers or access technologies by the user;
    accessing, by the IMS, a database to retrieve information related to the user and the event;
    establishing, by the IMS, a connection with an upstream customer application of a non-service provider upstream customer, wherein the upstream customer application is selected in accordance with the event and the information; and
    performing, by the IMS, an operation with the upstream customer application through the connection, wherein the operation is performed in accordance with the event, and wherein the operation comprises controlling delivery of a physical service provided by the non-service provider upstream customer to a downstream customer.

2. The method of claim 1, wherein detecting the occurrence of the event comprises detecting a registration message from the service provider with whom the user is attempting to register.

3. The method of claim 2, wherein the service provider is different from the user's home service provider.

4. The method of claim 1, wherein detecting the occurrence of the event comprises receiving positional information regarding the user.

5. The method of claim 4, wherein the positional information is provided by a presence server.

6. The method of claim 1, wherein detecting the occurrence of the event comprises detecting a connection establishment message from the user, a search for information from the user, a time marker on a transmission made by the user, or a combination thereof.

7. The method of claim 1, wherein performing the operation comprises:
    forwarding the information to the application; and
    receiving a response from the application.

8. The method of claim 7, wherein performing the operation further comprises forwarding the response to the user.

9. The method of claim 7, wherein forwarding the information takes place over the connection.

10. The method of claim 1, wherein performing the operation comprises:
    forwarding the information to the application; and
    serving as a conduit for messages between the application and the user.

11. The method of claim 1, wherein the physical service is at least one of mail delivery and newspaper delivery.

12. A method for upstream customer operation, the method comprising:
    establishing, by a non-service provider upstream customer, a connection with an Internet protocol (IP) multimedia subsystem (IMS);
    receiving, by the non-service provider upstream customer, information over the connection, wherein the information is in accordance with an event detected by the IMS via a service provider, and in accordance with an initiator of the event, wherein the event comprises a switch between service providers or access technologies by the initiator;

verifying, by the non-service provider upstream customer, the initiator; and performing, by the non-service provider upstream customer, an operation with the IMS through the connection, wherein the operation is performed in accordance with the event, and wherein the operation comprises controlling delivery of a physical service provided by the non-service provider upstream customer to a downstream customer.

13. The method of claim 12, wherein establishing the connection comprises receiving a transmission from the IMS.

14. The method of claim 13, wherein the connection is dedicated for use by transmissions made by the initiator.

15. The method of claim 13, wherein the connection is shared by transmissions destined for the non-service provider upstream customer from a plurality of different initiators.

16. The method of claim 12, wherein verifying the initiator comprises verifying a service level of the initiator.

17. The method of claim 12, wherein performing the operation comprises performing an action responsive to the event, transmitting targeted content to the initiator, transmitting a message to the initiator, or a combination thereof.

18. The method of claim 12, wherein the event comprises a connection establishment message from the initiator, a search for information from the initiator, a time marker on a transmission made by the initiator, or a combination thereof.

19. The method of claim 12, wherein the physical service is at least one of mail delivery and newspaper delivery.

20. A communications system comprising an Internet protocol (IP) multimedia subsystem (IMS) coupled to at least one downstream customer and to at least one upstream application of a non-service provider upstream customer, wherein the IMS is coupled to the downstream customer via a service provider, the IMS configured to:

detect an event initiated by the downstream customer;

retrieve information related to the downstream customer and the event;

establish a connection with the application in accordance with the event and the information; and perform an operation with the application, wherein the event comprises a switch between service providers or access technologies by the downstream customer, and wherein the operation comprises controlling delivery of a physical service provided by the non-service provider upstream customer to the downstream customer.

21. The communications system of claim 20, wherein the IMS comprises:

an application server configured to detect an occurrence of the event, and to establish the connection with the application in accordance with the event and the information;

a subscriber server coupled to the application server, the subscriber server configured to provide information for the downstream customer; and a presence server coupled to the application server, the presence server configured to provide state information related to the downstream customer.

22. The communications system of claim 21, wherein the IMS further comprises:

a proxy call session control function (CSCF) coupled to the application server, the proxy CSCF configured to serve as an initial point of contact for the downstream customer;

an interrogating CSCF coupled to the application server, the interrogating CSCF configured to regulate a flow of data between the downstream customer and the application; and a serving CSCF coupled to the application server, the serving CSCF configured to perform session control services for the downstream customer, and to maintain session state.

23. The communications system of claim 20, wherein the physical service is at least one of mail delivery and newspaper delivery.

* * * * *